G. H. ANDERSON.
CENTRIFUGAL PUMP.
APPLICATION FILED NOV. 29, 1915.
1,238,731.
Patented Sept. 4, 1917.
5 SHEETS—SHEET 2.
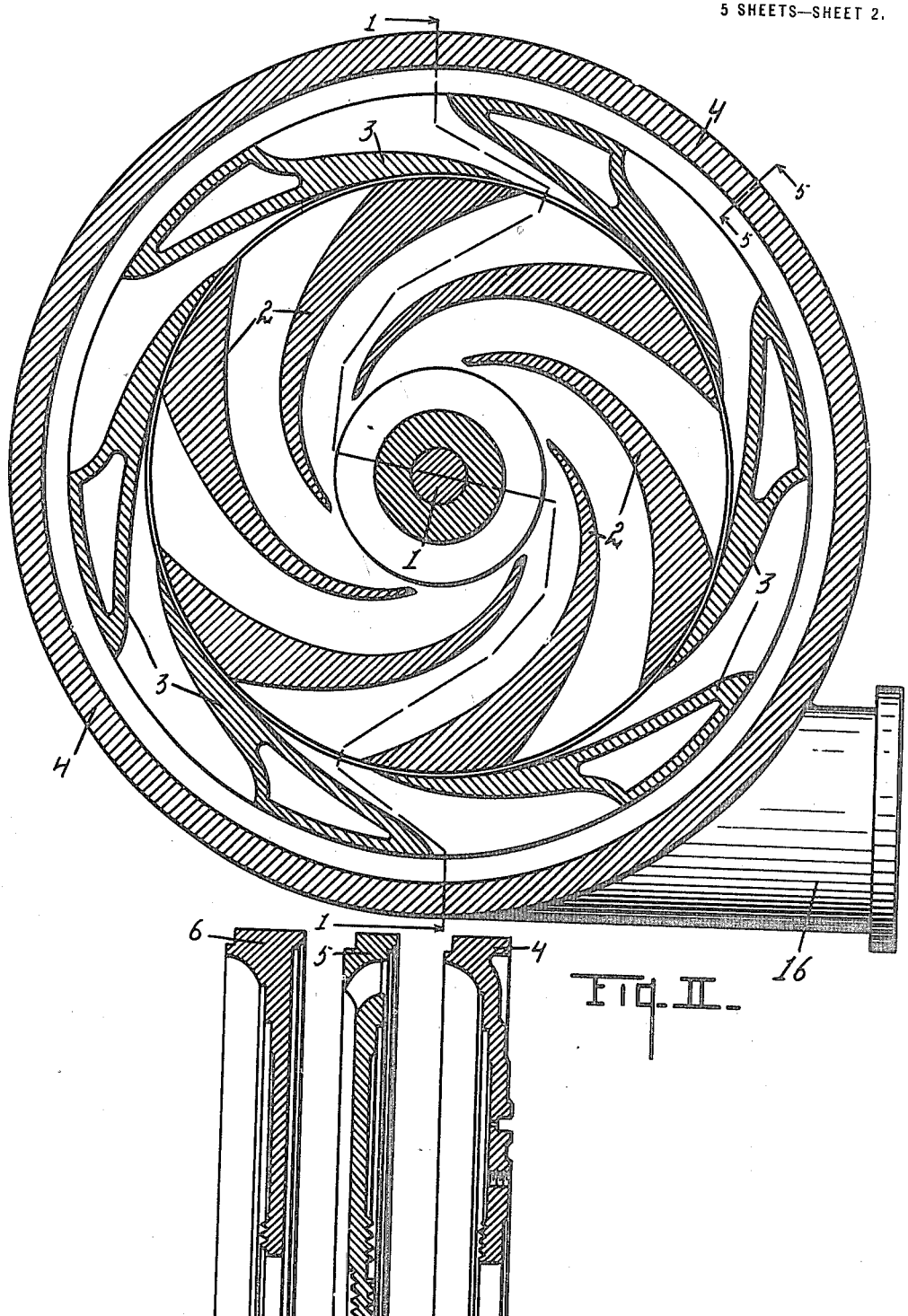
WITNESSES:
Luther Blake
Lenn Gilman
INVENTOR.
GEORGE H. ANDERSON
BY Chappell & Earl
ATTORNEYS.

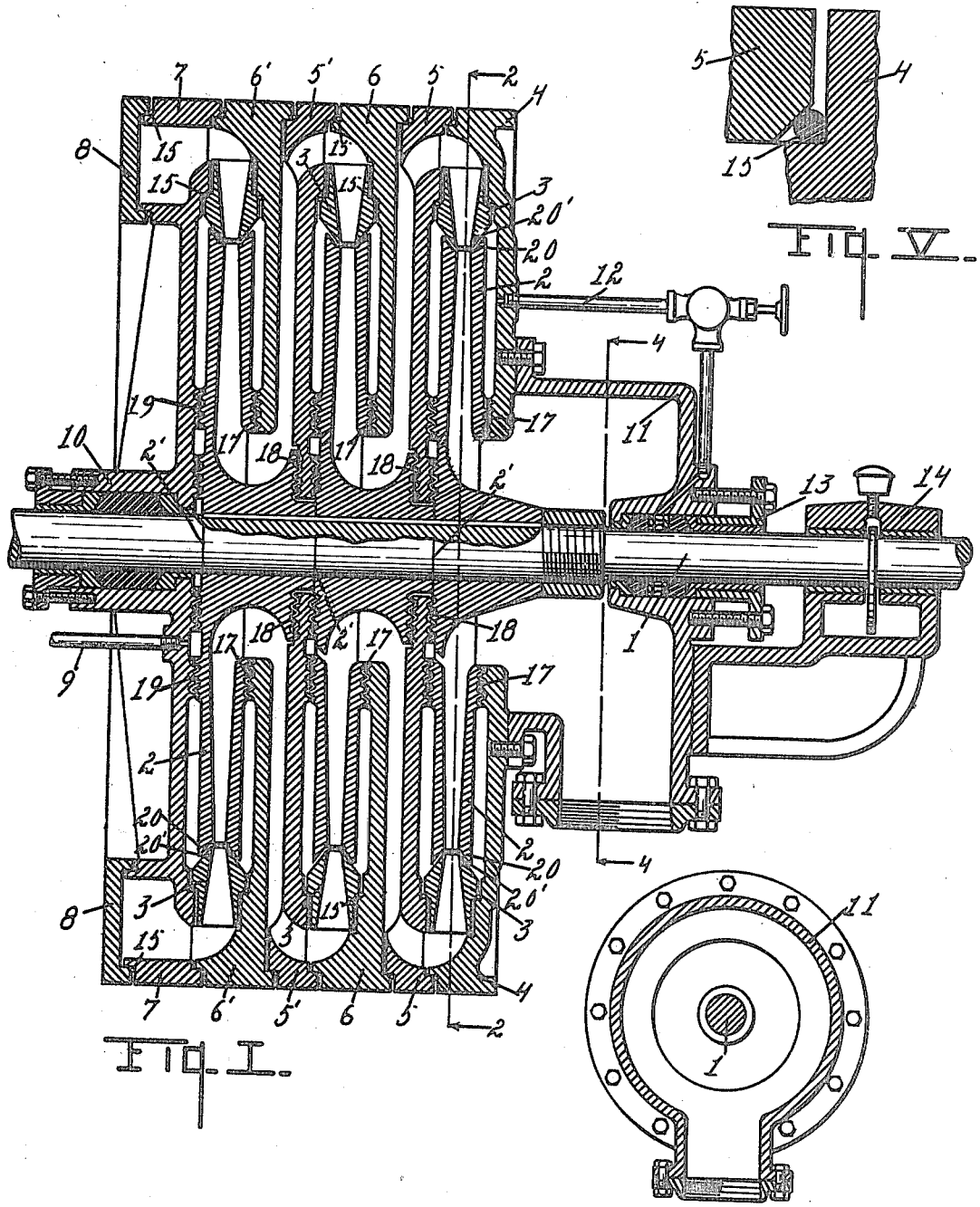

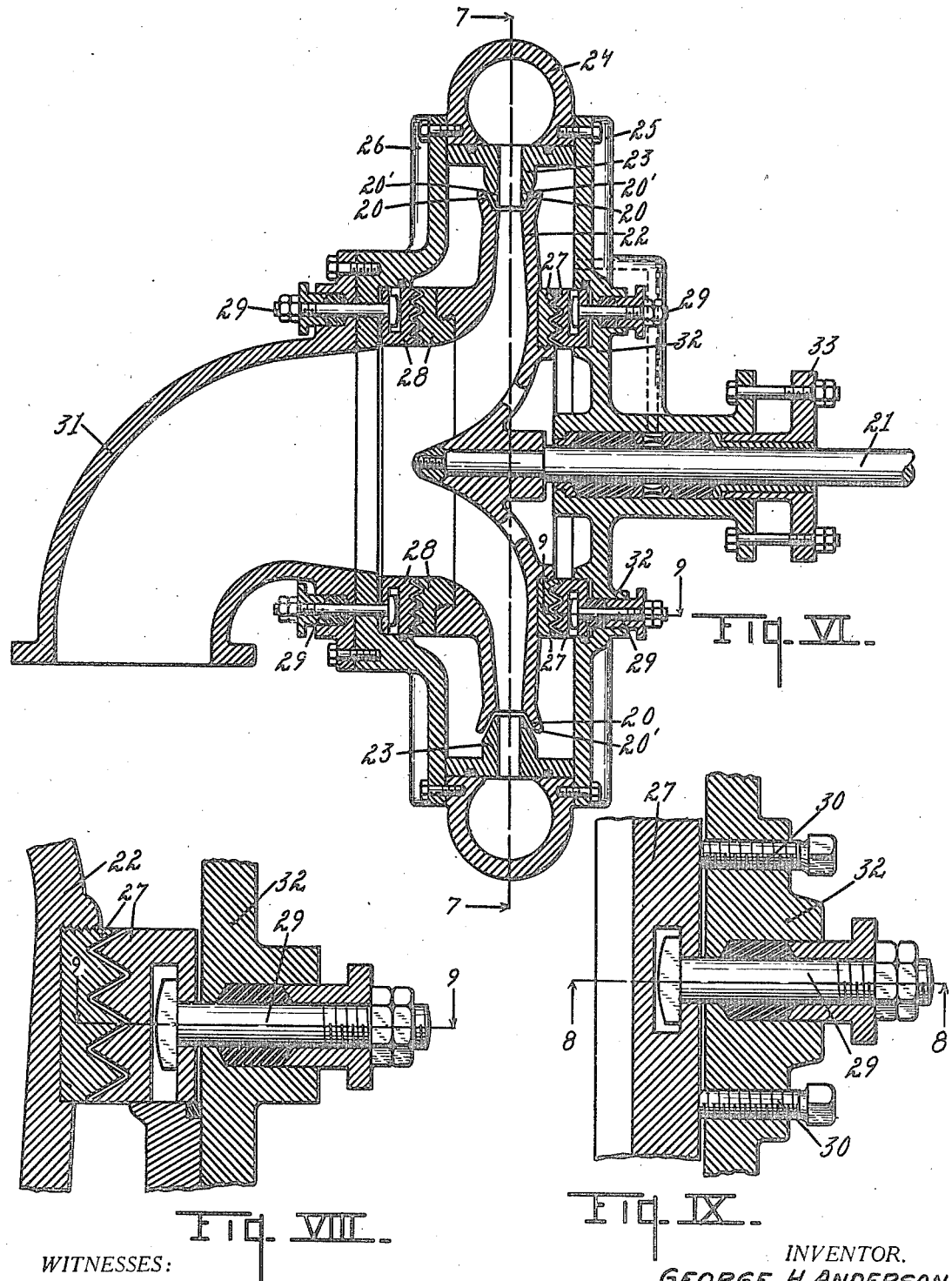

G. H. ANDERSON.
CENTRIFUGAL PUMP.
APPLICATION FILED NOV. 29, 1915.
1,238,731.
Patented Sept. 4, 1917.
5 SHEETS—SHEET 4.
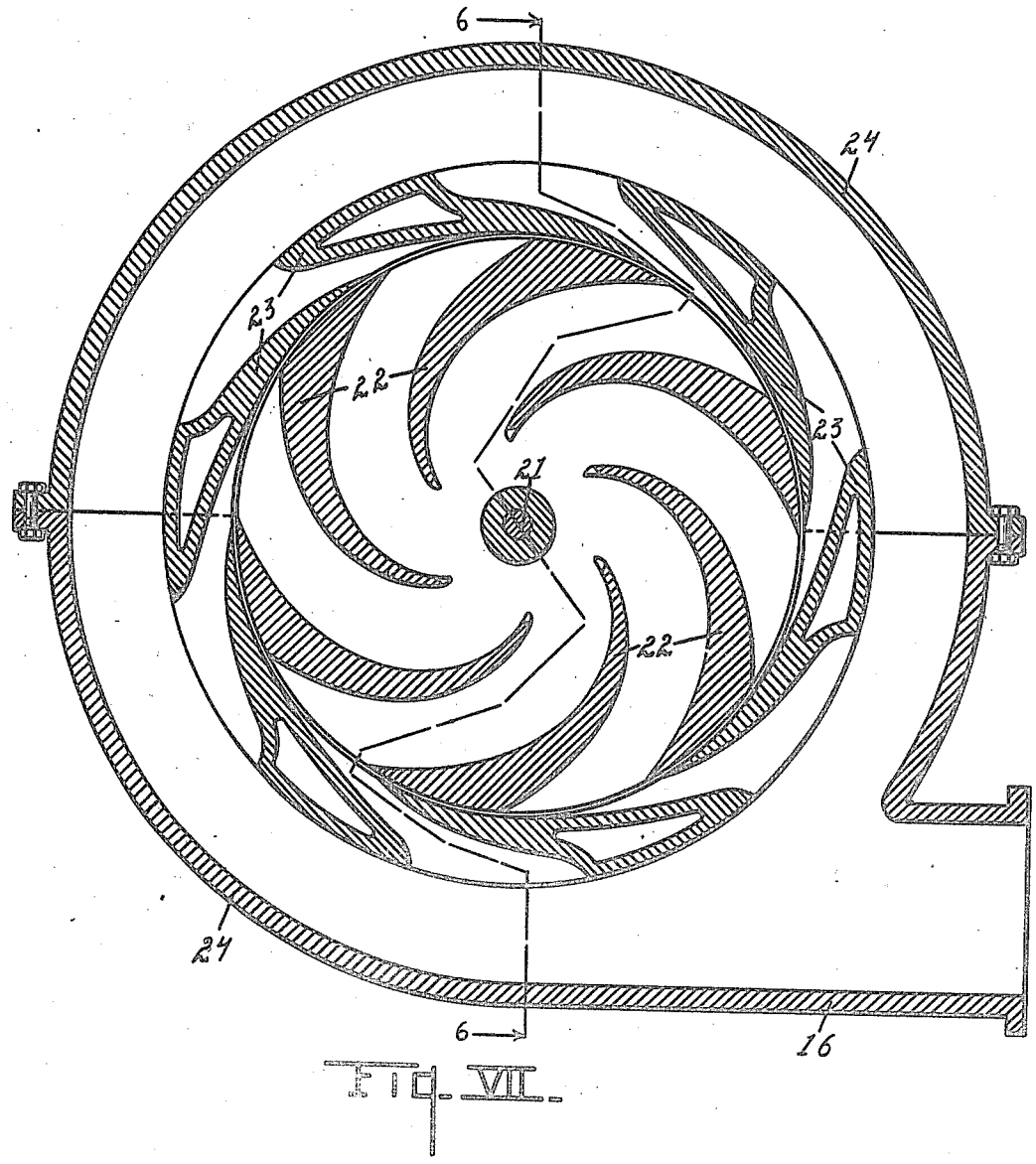
FIG. VII.
WITNESSES:
Luther Blake
Lenn Gilman
INVENTOR.
GEORGE H. ANDERSON
BY Chappell Earl
ATTORNEYS.

G. H. ANDERSON.
CENTRIFUGAL PUMP.
APPLICATION FILED NOV. 29, 1915.
1,238,731.
Patented Sept. 4, 1917.
5 SHEETS—SHEET 5.
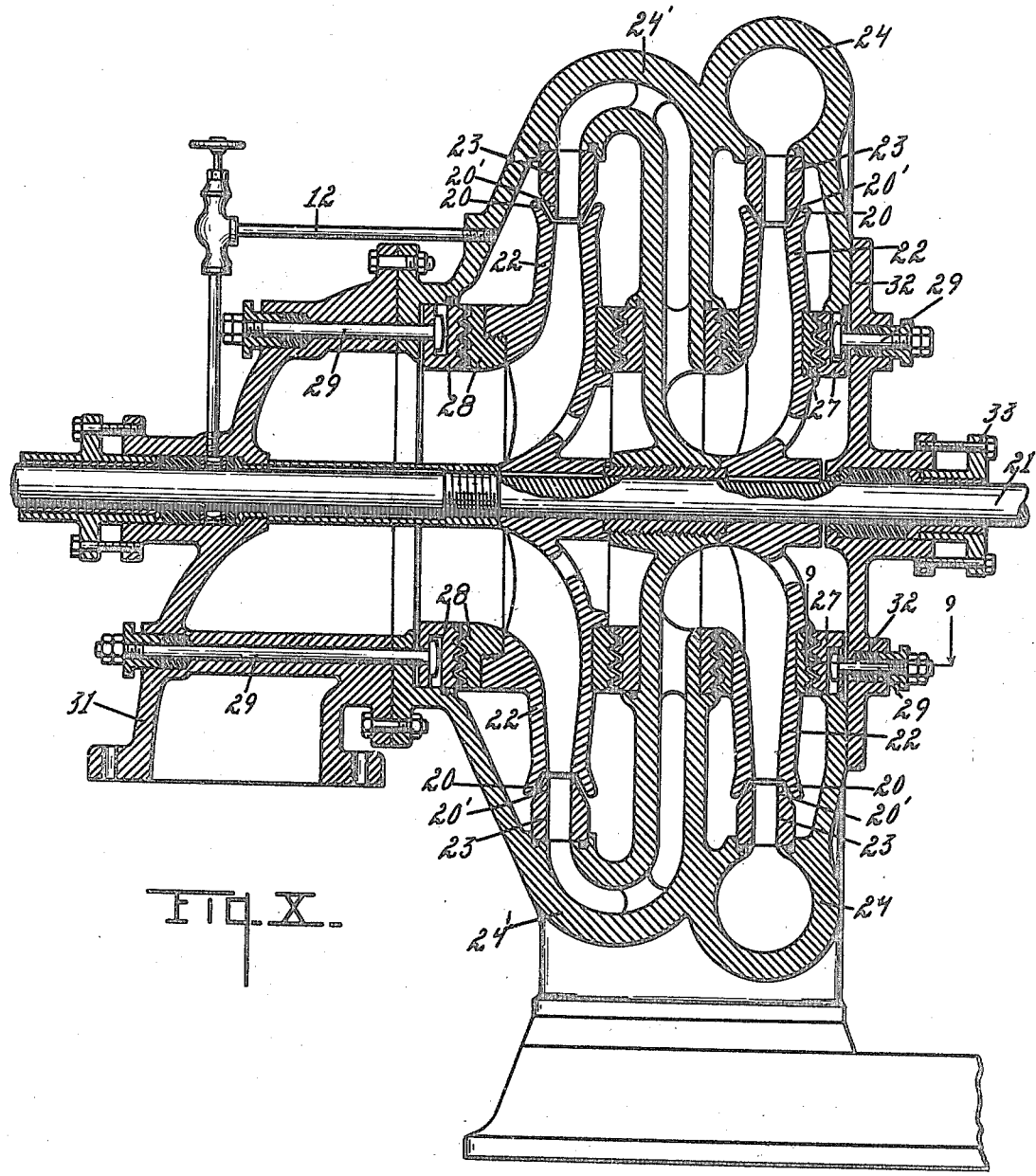
Fig. X.
WITNESSES:
Luther Blake
Lenn Gilman
INVENTOR.
GEORGE H. ANDERSON
BY Chappell & Earl
ATTORNEYS.

UNITED STATES PATENT OFFICE.

GEORGE H. ANDERSON, OF BATTLE CREEK, MICHIGAN.

CENTRIFUGAL PUMP.

1,238,731. Specification of Letters Patent. Patented Sept. 4, 1917.

Application filed November 29, 1915. Serial No. 64,146.

*To all whom it may concern:*

Be it known that I, GEORGE H. ANDERSON, a citizen of the United States, residing at Battle Creek, county of Calhoun, State of Michigan, have invented certain new and useful Improvements in Centrifugal Pumps, of which the following is a specification.

This invention relates to improvements in centrifugal pumps.

The objects of my invention are:

First, to provide improved means of automatically balancing and centering the impellers of such pumps to equalize the pressure thereon and avoid end thrust in the impeller shaft.

Second, to provide improved means of insuring lubrication of said impeller in conjunction with the said balancing means.

Third, to provide an improved detail sectional construction whereby the passages for the water are made accessible so they may be machined and made smooth.

Further objects, and objects relating to details and economies of construction and operation will definitely appear from the detailed description to follow.

I accomplish the objects of my invention by the mechanism and means described in the following specification. The invention is clearly defined and pointed out in the claims.

Structures which are preferred embodiments of my invention are fully illustrated in the accompanying drawings, forming a part of this specification, in which:

Figure I is a longitudinal sectional view through a multiple stage centrifugal pump embodying the features of my invention in one of the preferred forms, the same being taken on the irregular section line 1—1 of Fig. II.

Fig. II is a transverse detail sectional view taken on a line corresponding to line 2—2 of Fig. I, showing the relation of the impellers and diffusion vanes.

Fig. III is a detail structure of the casing plates 4, 5, and 6 of Fig. I showing their relations to each other and how the ports may be machined and the disks fitted together.

Fig. IV is a detail transverse sectional view somewhat reduced, taken on a line corresponding to line 4—4 of Fig. I, showing the intake chamber for the pump and an intake port thereto.

Fig. V is an enlarged detail sectional view taken on a line corresponding to the line 5—5 of Fig. II, showing the packing between the casing plates of the structure of Figs. I and II.

Fig. VI is a longitudinal detail sectional view through a modified form of my improved pump, of a usual form of single stage American design, taken on a line corresponding to the irregular line 6—6 of Fig. VII.

Fig. VII is a detail sectional view taken on a line corresponding to line 7—7 of Fig. VI.

Fig. VIII is an enlarged detail sectional view taken on a line corresponding to line 8—8 of Fig. IX, showing the adjusting means for adjusting the saw tooth equalizing and resistance bearing means.

Fig. IX is a detail transverse sectional view of the same means, taken on a line corresponding to line 9—9 of Figs. VI and VIII.

Fig. X is a detail longitudinal sectional view through a multiple stage pump of the American design, similar in detail to the single stage pump illustrated in Fig. VI.

In the drawing similar numerals of reference refer to similar parts throughout the several views and the section lines are taken looking in the direction of the little arrows at the ends of the section lines.

Considering the numbered parts of the drawing, the driving shaft 1 has the impellers 2, of any usual or desired form for a centrifugal pump, secured thereto and definitely located by suitable shoulders 2' on said shaft. 3 are the diffusion vanes of suitable form supported by suitable means between the casing plates or rings 4, 5, 6, 5', 6', 7 and 8, the plates 4 and 8 being the front and rear respectively.

A relief pipe 9 connects to the plate 19 to relieve any undue pressure on the side of the outside impeller. 10 is a stuffing box for the shaft at the discharge side of the pump. 11 is the intake chamber. 12 is the water connection to the stuffing box 13 to insure effective water packing and lubrication at that point. 14 is the bracket carrying the journal bearing. 15 is the packing between the casing plates consisting of a ring of rubber adapted to completely fill the triangular spaces formed between these plates at their shoulders and supplementing the steam tight fit of the metal to metal itself. 16 is the discharge outlet. 17 is the saw tooth annular joint between the impellers and the casing. 18 represents the saw tooth annular rings forming the bearing joint of the partition plates 5, 5′ with the hub portions of the impellers. 19 is the special double saw tooth joint of the annular rings between the end impeller and the end plate 7. Each impeller 2 is provided with a V-shaped peripheral groove 20 which embraces a correspondingly projecting part 20′ on the diffusion vanes.

It will be seen in this construction illustrated in Figs. I to V that the entire structure may be made up of standard units and the same can be completely machined with the exception of the comparatively small apertures through the plates 5 and 5′ which can be readily filed out with a special shaped file, thus insuring perfectly smooth parts for the passage of the water in the pump, thus greatly enhancing and insuring its efficiency.

It will be clear that when the parts become worn so that they do not operate effectively, they can be taken apart and dressed down and brought into better engagement, when the pump will again be as effectively operative as when new.

It will be seen that when power is applied to the shaft 1 the suction on the water and also the velocity and impact of the water will have a tendency to shift the impellers first in one direction and then the other, and that the pressure of water created by their rotation will exert constant and varying forces, the tendency being to cause an undue thrust of the parts. The spaces surrounding the rotors become filled with water, which, of course, is under pressure and tends to work back through the joints at 17 and also the water will tend to work around the joints 18 and 19 about the casing. When the pressure exerted on the rotors moves them in one direction, the saw tooth bearing ring at that side will tend to close and restrict the flow of water therethrough, thereby increasing the pressure on that side and lowering the pressure on the opposite side, and the flow of water will naturally be to some extent increased on the opposite side, but this movement secures a counter effect on the operation of the annular groove 20 and the corresponding engaging portion 20′, and the supply of water will automatically be reduced on the side at which the pressure occurs, and increased on the opposite side with a restriction of the space at the saw tooth bearing part, and the tendency will be for the impeller to immediately return past its initial position, but as soon as it passes beyond the center the reverse condition occurs and the impellers immediately oscillate in the opposite direction. The reaction of the water on the bottom of the saw-toothed grooves is also greatest in the most restricted grooves, and as this reaction is parallel with the axis, it also serves to keep the impellers in a balanced position.

The result is that it tends to oscillate through very narrow limits and is kept constantly centrally located and the thrust is resisted so that the impeller revolves with great freedom without end thrust, securing the highest efficiency.

I have shown a preferred construction in Fig. I, but the American design of pump is somewhat different, the impeller and casing being cored out and cast,—see Fig. VI where I have numbered the shaft 21, the cast impeller of peculiar design 22, the diffusion vanes 23, the peripheral casing 24, the discharge end plate 25 and the intake end casing plate 26. I have here shown, because of the necessity of adjusting the parts themselves, adjustable saw tooth packing rings 27 and 28, the movable member of which is adjustable by bolt 29 in a stuffing box through the casing plate 32 by set screws 30. The intake 31 is secured in place by bolts or otherwise. The stuffing box 33 is similar to the stuffing box 13, only somewhat more extensive because of the special structure. The annular groove 20 on the impeller and the projecting portion 20′ on the diffusion vanes are precisely the same as in the first structure.

In Fig. X I show a multiple structure comparable with that in Fig. VI with intermediate cast and cored casing member 24′, the other parts being precisely similar and numbered the same.

While I have shown saw tooth packing rings coöperating with the annular groove 20 and the projection 20′ because of their special adaptability to this use, I am aware that this packing might be plain or otherwise made up of parts that would approach and recede from each other, and still produce a more or less effective device. The saw tooth bearing is available with any form of impeller and diffusion vane, but especially coacts with the shape I have shown. I might mention that the pump can be supported on any suitable base or that suitable feet, as indicated in Fig. X, could be formed on the casing members themselves.

I have thus described my improved pump in all its details, I desire to claim the same in the specific form and also to claim the same broadly, as pointed out in the appended claims.

Having thus described my invention, what I claim as new and desire to secure by Letters Patent, is:

1. In a centrifugal pump, an impeller with suitable shaft for rotating the same, provided with concentric annular saw-tooth shaped projecting bearing portions and an- ъular V-shaped peripheral grooves, casing members with annular saw-tooth packing members corresponding to the annular saw-tooth bearing portions on said impeller and spaced therefrom, and a diffusion vane with projecting portions corresponding with and coacting with the peripheral grooves in the said impeller, coacting for the purpose specified.

2. In a centrifugal pump, an impeller with an annular V-shaped peripheral groove, a suitable casing therefor conformed to coact with the sides thereof and form bearings, and a diffusion vane with projecting portion corresponding with and coacting with the V-shaped peripheral groove in the said impeller, the openings in said impeller and diffuser being of substantially the same width as specified.

3. In a centrifugal pump, an impeller with suitable shaft for rotating the same, provided with concentric annular saw-tooth shaped projecting bearing portions, casing members with annular saw-tooth packing members corresponding to the annular saw-tooth bearing portions on said impeller and spaced therefrom, coacting for the purpose specified.

4. In a centrifugal pump, an impeller with suitable shaft for rotating the same, provided with annular saw-tooth shaped projecting bearing portions, casing members with annular saw-tooth packing members corresponding to the annular saw-tooth bearing portions on said impeller and adjustable toward and away from the projecting portions of said impeller, coacting for the purpose specified.

5. A multiple stage centrifugal pump comprising a driving shaft, a series of impellers thereon with concentric annular saw-tooth bearing portions on their faces and hubs and with peripheral V-shaped grooves, separable casing plates with annular saw-tooth members for coacting with the corresponding bearing portions on said impellers and their hubs and spaced therefrom, fitting one against the other with suitable packing means therebetween, and diffusion vanes with inwardly projecting portions to engage and coöperate with the annular grooves in said impellers, coacting as described.

6. A multiple stage centrifugal pump comprising a driving shaft, a series of impellers thereon with concentric saw-tooth bearing portions on their faces and hubs, separable casing plates with annular saw-tooth bearing members for engaging the corresponding bearing portions on said impellers and their hubs and spaced therefrom, fitting one against the other with suitable packing means therebetween, and diffusion vanes, coacting as described.

7. In a centrifugal pump, a shaft, an impeller provided with a hub mounted upon said shaft, the faces of said impeller and said hub being provided with concentric annular saw-toothed projecting bearing portions, annular casing members provided with annular saw-toothed members corresponding to, coacting with the annular saw-toothed bearing portions of said impeller and hub and spaced therefrom, the inner edges of said casing members being spaced from said hub.

In witness whereof, I have hereunto set my hand and seal in the presence of two witnesses.

GEORGE H. ANDERSON. [L. S.]

Witnesses:
   TRESA A. LINK,
   MARTIN P. HUYCK.